United States Patent [19]

Ehrreich

[11] Patent Number: 4,716,081

[45] Date of Patent: Dec. 29, 1987

[54] CONDUCTIVE COMPOSITIONS AND CONDUCTIVE POWDERS FOR USE THEREIN

[75] Inventor: John E. Ehrreich, Acton, Mass.

[73] Assignee: Ercon, Inc., Waltham, Mass.

[21] Appl. No.: 757,061

[22] Filed: Jul. 19, 1985

[51] Int. Cl.[4] .......................... B32B 5/16; B05D 7/00; H01B 1/02

[52] U.S. Cl. .................................... 428/403; 427/123; 427/126.5; 427/216; 427/217; 427/229; 427/437; 252/512; 252/514; 75/0.5 B

[58] Field of Search ................ 252/512, 514; 523/137, 523/457; 419/31, 35; 420/469; 428/403, 407; 427/212, 226, 229, 328, 372.2, 437, 123, 126.5, 299; 524/439, 440; 75/0.5 B, 0.5 A

[56] References Cited

U.S. PATENT DOCUMENTS

| | | | |
|---|---|---|---|
| 3,194,860 | 7/1965 | Ehrreich et al. | 252/511 |
| 3,202,488 | 8/1965 | Erhreich et al. | 252/514 |
| 3,583,930 | 6/1971 | Ehrreich et al. | 252/514 |
| 4,242,376 | 12/1980 | Kawasumi et al. | 427/216 |
| 4,309,457 | 1/1982 | Kawasumi et al. | 427/216 |

*Primary Examiner*—Josephine L. Barr
*Attorney, Agent, or Firm*—Andrew F. Kehoe

[57] ABSTRACT

An improved silver-coated copper-based powder which is characterized by extraordinary stability, in terms of electroconductivity, when the powder is utilized with organic resin to form electroconductive compositions. The powder is made by subjecting it to an intensive heat treatment after the silver is coated thereon.

33 Claims, 4 Drawing Figures

CONDUCTIVE COMPOSITIONS AND CONDUCTIVE POWDERS FOR USE THEREIN

BACKGROUND OF THE INVENTION

Figure 1:
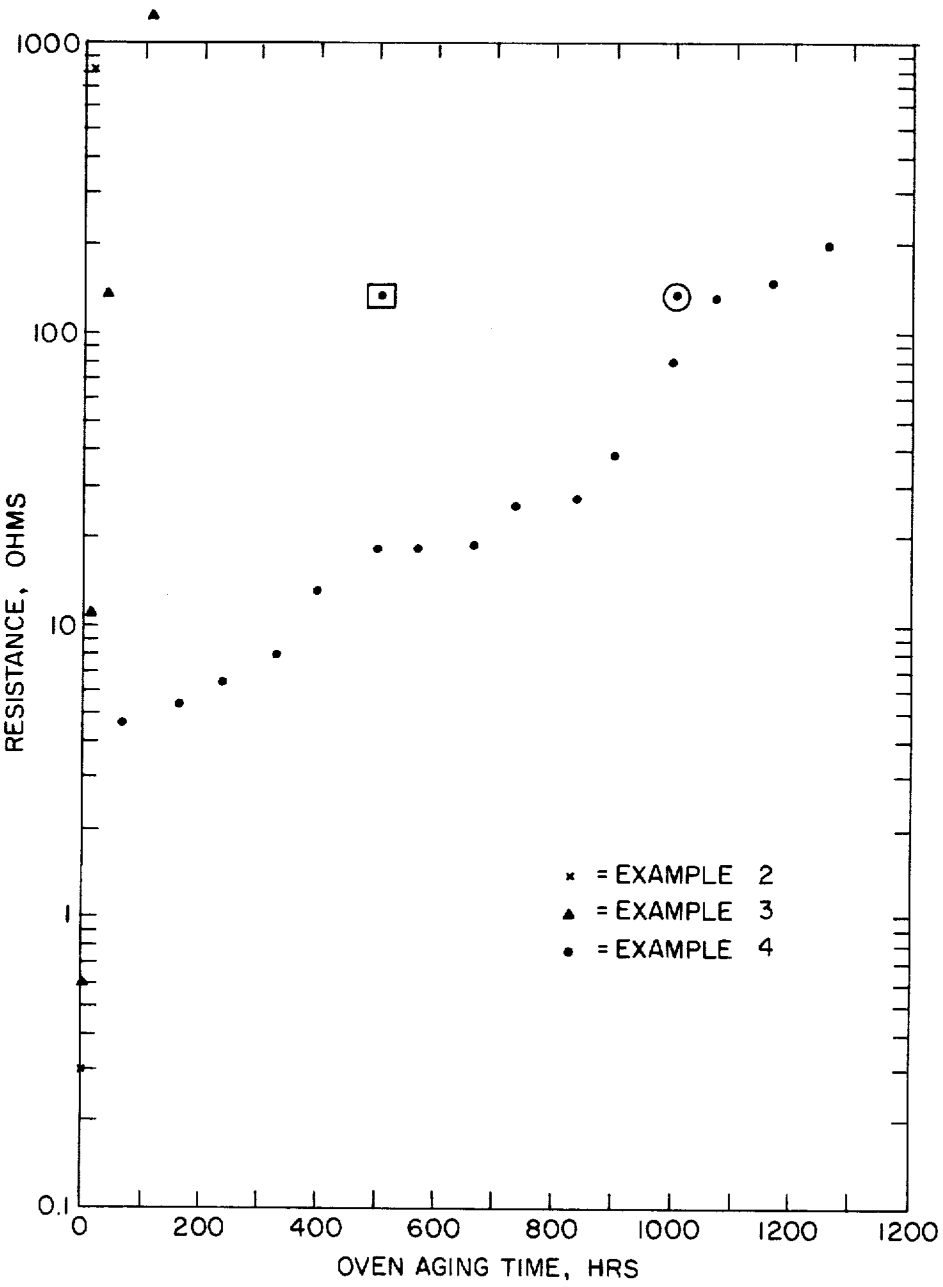
Figure 2:
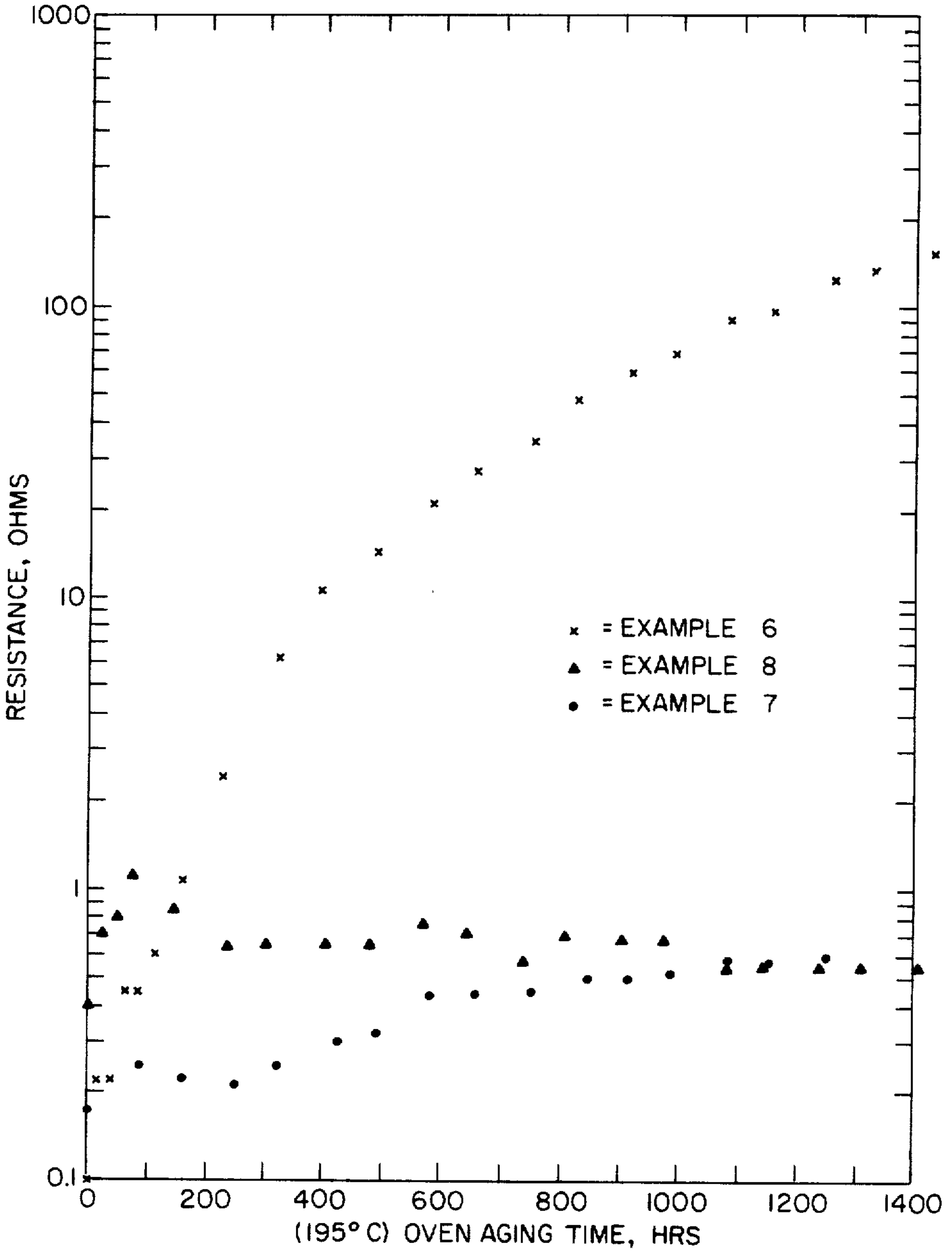
Figure 3:
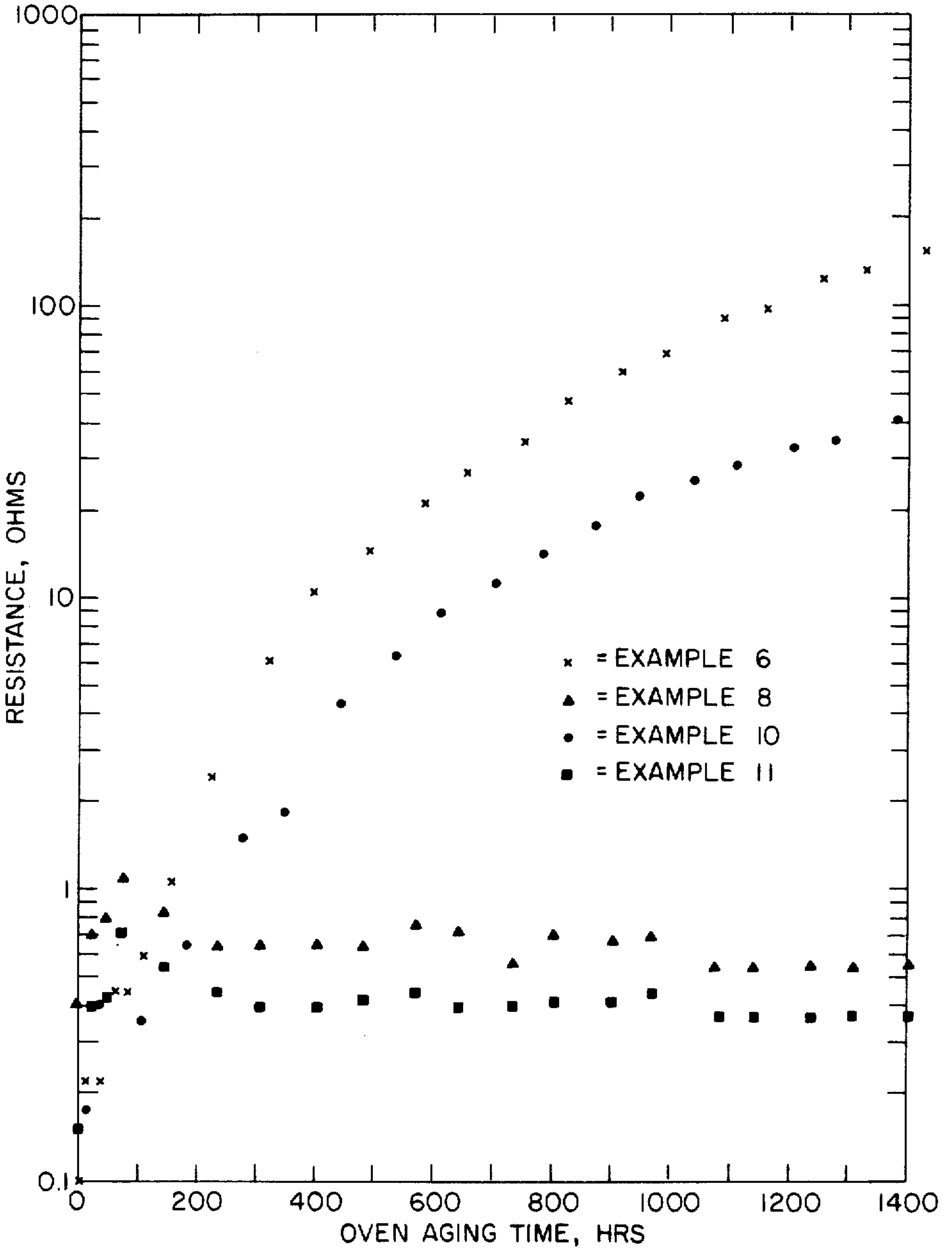
Figure 4:
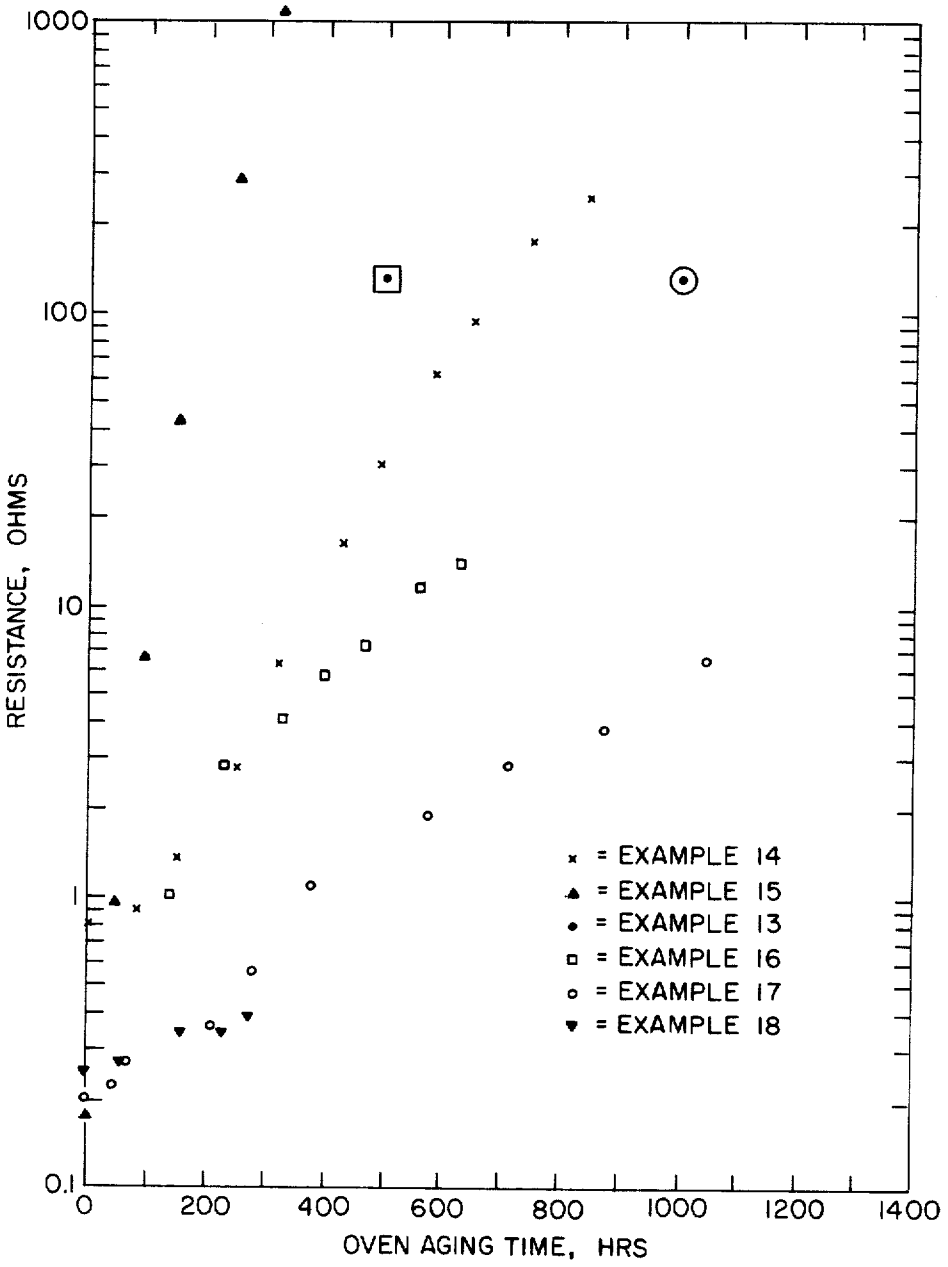

This invention relates to an improved method of making silver-surfaced metal particles, to improved particles made by such processes, and to "conductive plastic" formulations (as broadly construed,e.g. including plastics, rubbers, and resins) or electromagnetic interference and radio-frequency shielding applications, microwave gaskets, conductive adhesives other such applications.

Silver-surfaces powder has long been used as a conductive filler in "conductive plastic" formulations. For example, Ehrreich et al disclose in U.S. Pat. No. 3,202,488 a procedure for plating silver onto copper to provide such powders. It has also been known to coat aluminum with silver to form conductive particles. One problem with these powders, when incorporated into organic binders, was that they tended to became excessively electroresistive as they aged especially at elevated temperatures. Consequently, they proved to be unsuited for a great many purposes. Moreover, it was preferable in many applications that there would not be a large increase in resistance during the life cycles of the filled product.

In powders, as were made by the process of U.S. Pat. No. 3,202,488, could not be utilized suitably in many of the applications described in U.S. Pat. Nos. 3,140,342; 3,583,930; 3,609,104 and 3,194,860. In general, they did not exhibit sufficient stability at elevated temperatures or over long periods of time.

Aging and stability problems of the prior art were particularly apparent in resilient or softer systems where the conductive powders were not compressed during cure and locked into place by a rigid matrix system.

An interesting aspect of earlier work on silver-coated copper powder was that such powders were sometimes tested for stability by heating them to relatively high temperatures for short periods of time. The heat-treated material was then measured for bulk electroconductivity using two probes across a mass of the powder and this measurement was for a use in deciding whether the powder was "good". This test was considered a destructive test, in the sense that is was though to accelerate the loss of desirable properties by the powder, and the powder was discarded after the test. The test is described in U.S. Pat. No. 3,202,488. Subsequently, such a heating procedure, when carried out on the silver-coated powder for as long as four hours at about 190° C., was found to lend some additional electronconductive stability to compositions prepared using such heat tested powder. Nevertheless a need remained for a more stable silver-coated particle with a non-noble metal core.

SUMMARY OF THE INVENTION

It is a principal object of the present invention to provide an improved method of making conductive plastics utilizing silver-coated, particles of base metals as the current-carrying filler within a resin matrix.

An important object of the invention is to provide improved electroconductive compositions wherein the metal powder is not locked in a rigid composition but is held in a resilient or soft composition.

Another object of the invention is to provide silver-coated, non-noble-metal powders which exhibit much improved electroconductive stability when utilized as fillers in resin-based compositions.

Particular objects of the invention is to provide improved silver-coated copper particles and processes for making said particles.

Another object of the invention is to provide an improved process for preparing copper powder for silver plating and subsequent heat treatment.

A further object of the invention is to provide an improved process for treating silver-plated copper powder in preparation for using it as an electroconductive filler in resin-based matrices, a process particularly desirable copper-powder is prepared for plating according to the teachings herein.

A further object of the invention is to provide superior electromagnetic-energy-shielding sealing compositions, particularly in the form of gaskets and the like, wherein said compositions exhibit superior electroconductive stability and excellent physical properties.

Other objects of the invention will be obvious to those skilled in the art on reading this disclosure.

An important and surprising advantage has been achieved by the discovery that a long-term, heat-treatment of silver-plated copper particles markedly improves their electronconductive stability once they are incorporated in a resin matrix, surprisingly, this effect does not seem to depend on the absolute electroconductivity measured between two electrical probes inserted into the bulk powder after the bulk powder is removed from the heat treatment. Thus, the improved heat-aged stability of copper powder, as discussed herein, relates to its aging in a heated plastic matrix not to its apparent electroconductivity as a bulk powder.

It has been found that the advantages of the long-term heat-treating invention are enhanced by use of a silver-coated copper powder wherein the copper powder substrate has been pre-treated for several minutes in a bath of a silver-complexing, or silver-chelating agent, such as a sodium-cyanide or potassium cyanide bath. The powder so pretreated then can be plated immediately without the need of any conventional acid-washing and rinsing steps. Excellent results appear to be achieved with a cyanide-based electroplating bath, e.g. a batch containing dissolved potassium or sodium cyanide. However, other silver-complexing agents capable of a controlled, surface-enhancing removal of oxide and surface contamination are also useful. Nevertheless, the major advance disclosed herein appears to be associated with the very long-term heat-treatment of the silver-coated base-metal powder before it is incorporated into the resinous matrix.

The heat treatment may be suitably carried out in an oven with a circulating air environment at a temperature of about 200° C. in excess of 24 hours. The preferable treatment time, at 200° C., for a period of from 24 hours to several hundred hours. Lower temperatures may be utilized, e.g. temperatures of about 150° C. have been found effective when used for times in excess of about 70 hours. Excellent results are obtained at 150° C. for 1500 hours. For silver-coated powder, temperatures much above 200° C., say 220° C., tend to cause undesirable degradation of the metal.

The particles to be treated may conveniently be particles wherein the substrate metal is copper having a maximum average particulate dimension of 25 mils and wherein the amount of silver deposited on the copper is in the range about 0.2 to 8 troy ounces of silver per pound of the powder. The powder is typically in the range of about 0.5 mils to 10 mils in average diameter and carries, typically about 0.5 to 4 troy ounces of silver per pound of copper. (The particles described herein are the actual discrete particles which, in form, may be agglomerates formed during the manufacturing process from more elemental particles which are much smaller in size.)

The electrically conductive plastic compositions formed with the silver powder are characterized by much-improved conductivity (often magnitudes higher) than that of a control composition prepared according to the prior art. These advantages are apparent when comparisons are based on accelerated aging tests and when the application require use of the materials at elevated temperatures.

Thus, the advantage of the invention is greatest when the silver coating is relatively thin. With enough silver on the copper powder, the invention will lose any pertinence; but, of course, any such increased silver content will reduce, very markedly, any commercial advantage otherwise achievable by the replacement of a pure silver powder with one having a copper core. Copper is a non-noble metal of particular interest because of its low relative price, its high conductivity, and the fact that it has the ability to more readily diffuse into or through imperfections in a thin silver coating than would most substrate metals.

In the most preferred embodiments of the invention, there is little or no significant rise in the resistivity of the conductive plastic over a period of 1000 hours, indeed even 2000 hours at 195° C.

In still highly advantageous embodiments of the invention, still superior to silver-coated copper powders of the prior art, the resistivity will be less than 2 ohm-cm after 500 hours at 195° C.

In still other embodiments of the invention very substantial decreases in the decay rate of conductivity experienced in prior art silver-coated copper powders is achieved: e.g. the average increase in resistivity is reduced to a factor of 100 or less per 100 hours of heat aging in the test formulation at 195° C.

The materials are best prepared by a combination of a pretreatment believed to provide effective removal of oxide and other surface contamination and extensive heat treatment which follows addition of the silver to the base metal substrate. The still-highly advantageous materials can be prepared by intensive heat treatments and the other embodiments by less severe heat treatment.

Of course one can select other test formulations and obtain similar advantageous results in electroconductive stability. Nevertheless, the powders are particularly advantageous when combined with high performance silicone resins matrices as disclosed herein.

Among the compositions and articles which are made using the powders of the invention are electromagnetic-energy-shielding gaskets formed from all of the resilient, e.g. silicone-based formulations described herein having definitive form-stable shape, e.g. of the type used to fit a closure to be sealed. Such gaskets are usually flexible and resilient with durometer of less than 95 Shore A. Articles may be formed by injection, transfer, compression molding depending on the shape and matrix material selected. They may be processed by calendaring or extrusion. Elastomeric matrix materials are particularly useful. Sometimes it is convenient to make the composition of invention in paste form that can be extruded as a caulking compound. It is not essential that particle-to-particle contact be maintained in said liquid; however such contact must occur on subsequent solidification, e.g. as the composition decreases in volume on curing or drying as the case may be. Pressure during curing much improves the conductivity of the material. Such articles may be formed with additional structural means, e.g. web or wire reinforcement and the like.

The crease-resistant silicone binder system, illustrated herein, comprises as a first silicone component a vinyl gum type of silicone resin system. The system may be one of the type usually cured with a peroxide-type curing agent. However, in the illustrated binder system, it will be cured with the curing agent conventionally utilized with the second silicone component, described below, of the homogeneous binder system.

The second type of silicone resin which is advantageously used to provide a mixture with improved crease resistance is a liquid silicone resin, such as those sold under the trademark, Silastic E, Silastic J and Silastic L by Dow Corning Company and General Electric Company's material sold under the tradename RTV-615. These systems are sold as two-part systems along with the curing agent therefor.

The crease resistance of the silicone formulations survive long curing cycles, e.g. the crease resistance remains intact after about 20 hours at 200° C. and, indeed, after even more severe thermal testing.

The crease test by which such compositions are tested is merely one in which electrically-conductive sheets, formed of the two-part silicone binder and a quantity of metal particles sufficient to achieve good particle-to-particle contact, can be folded over at 180-degree angle and held in place with the fingers (a "pinch fold") without cracking. Sheets of about 70 mils are suitably used in the test.

ILLUSTRATIVE EXAMPLES OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIGS. 1, 2, 3 and 4 will show aging data of different silver-coated copper powders based on the change in electroconductivity of a standard powder-filled silicone resin sample with time.

The temperature reported for the following examples are those measured in a circulating air oven. Quantities of metal being heated were sufficiently small so thermal inertia in heating could be ignored.

EXAMPLE 1

Example of Prior Art Plating Process

A copper powder (SCM Metal Products' Grade 943 untreated irregular copper particles produced by an atomization-reduction process and having a particle size distribution of 5 percent maximum retained on 150 mesh and 10 percent maximum minus through 325 mesh) was silver replacement plated by a process similar to that described in Example I of U.S. Pat. No. 3,202,488 using initial sodium cyanide concentrations of 18 oz./gal and plating 2 troy ounces of silver per pound of copper powder by the addition of the silver cyanide solution to the acetic-acid precleaned copper powder while mixing, followed by five water rinses and drying of the plated powder.

EXAMPLE 2

A conductive silicone sheet was prepared by the following process:

A silicone mix was formed of 18 parts by weight of silicone (500 parts Dow Corning Silastic E and 100 pats GE SE-33 gum) and 2 parts of Silastic E curing agent. Sixty parts of the silver coated copper powder from Example 1 were mixed with the 20 parts of the silicone mix to give a heavy dough-like mix. The powdered metal/silicone composition was placed as an oblong ball shape in the center of a 12 inch by 12 inch by 0.005 inch EL Mular sheet with a 32 mil-thick aluminum chase (1 inch wide with 8 inch by 10 inch opening) and a 12 inch by 12 inch by 0.060-inch aluminum back-up plate. ("EL Mylar" is a designation used by DuPont for its electronic grade biaxially-oriented polyester polymer film).

On the top another 12 inch by 12 inch by 0.005-inch EL Mylar sheet was placed with another 12 inch by 12 inch by 0.06-inch thick aluminum back-up plate. This sandwich was placed in a press under 12 tons pressure at 150° C. for 15 minutes. Thereafter, the resulting conductive silicone sheet was taken out of the press and placed in an oven at 195° C. for 30 mins. After, postcuring the sheet was 0.035 inch thick. A ½-inch by 4-inch piece of the sheet was cut out, and the resistance was measured by placing volt-ohm meter probes on the surface across the ½ inch width and with 3 inches between probes. The resistance of this strip was 0.3 ohms. (This estimated to be about 0.004 ohm-cm in terms of volume resistivity; other such volume-resistivity estimates are set out below in parenthesis following the surface resistivity measurement).

The above conductive strip was then aged at 195° C. and tested periodically by cooling to room temperature and measuring its resistance. (FIG. 1). After 15 hours at 195° C., the resistance was 800 ohms (about 11.9 ohm-cm); after a total of 39 hours, the resistance of the strip was greater than 50,000 ohms.

The above silicone formulation and sheet preparation procedure is called, herein, The Standard Test. While the conductive powder (both amount and technique of preparation) may be varied. The initial volume resistivity of the Standard Test formulation will be such that the volume resistivity will be 0.1 ohm-cm or less, and the conductive silicone sheet will have the capability of being pinch folded upon itself (at a 1/16-inch thick sheet).

EXAMPLE 3

A conductive silicone sheet was prepared with the processing conditions and materials described in Example 2 excepting that the silver coated copper powder was heat pretreated at 195° C. for 15 hours before being added to the silicone mix and, thereafter, making up the conductive silicone sheet. A ½-inch by 4-inch strip was cut out of the resulting 0.032 inch thick, conductive, silicone sheet. The resistance of the strip, measured as before with probes 3 inches apart and on opposite sides of the ½-inch width, was 0.6 ohms (about 0.009 ohm-cm). This conductive silicone strip was aged at 195° C. and tested periodically for resistance at room temperature (FIG. 1). After 15 hours at 195° C. the resistance was 11.3 ohms (about 0.17 ohm-cm). And after a total of 39 hours the resistance was 135 ohms (about 2.0 ohm-cm).

EXAMPLE 4

Another conductive silicone sheet was prepared by processing conditions and materials as described in Example 2, excepting that the silver-coated copper powder was heat pretreated at 195° C. for 252 hours before it was used to make up the conductive silicone sheet. A ½-inch by 4 inch strip was cut out of a resulting 0.035 inch thick conductive silicone sheet. The resistance of the strip with probes 3 inches apart was 4.5 ohms (about 0.067 ohm-cm).

The above conductive silicone strip was aged at 195° C. and tested periodically for resistance at room temperature (FIG. 1). After 65 hours at 195° C. the resistance was 4.6 ohms (about 0.068 ohm-cm). This thermal pretreatment of the silver coated copper powder produced a conductive silicone strip that withstood 1000 hours at 195° C. before its resistance was measured at 135 ohms (about 2 ohm-cm).

EXAMPLE 5

A similar copper powder as that described in Example 2 was silver replacement plated by a process similar to that described in Example I of U.S. Pat. No. 3,202,488 except that the acetic acid precleaning of the copper powder was eliminated. Instead, the powder was subjected to a pretreatment in a sodium cyanide solution (24 oz./gal.) for 11 minutes with mixing. This step was followed, immediately and, without rinsing by the 2 min. addition of the silver cyanide-sodium cyanide solution and plating of 2 troy ounces of silver per pound of copper powder onto the pretreated copper. Subsequently, the plated powder was washed five times with water (so that the powder is free of cyanide contamination) and is dried in air at 150° F.

EXAMPLE 6

A conductive silicone sheet was prepared according to Example 2, except that 60 parts by weight of Example 5 silver coated copper powder was used. This powder was treated for 15 hours at 195° C. before its use as the conductive filler. A ½-inch by 4-inch strip was cut out of a 0.035 inch thick conductive silicone sheet. The 3-inch spaced resistance measurement of this trip was 0.1 ohms (about 0.0015 ohm-cm). The resistance after aging (FIG. 2) of this strip at 195° C. for 113 hours was 0.6 ohms (about 0.0089 ohm-cm). The resistance of this strip was not measured to be as high as 135 ohms (about 2 ohm-cm) until 1325 hours of aging at 195° C.

EXAMPLE 7

A conductive silicone sheet was prepared by similar processing conditions and materials as those described in Example 6 with except that the silver coated powder from Example 5 was pretreated at 195° C. for 135 hours before it is used to make up the conductive silicone sheet. A ½ inch by 4 inch strip was cut out of the 0.034 inch thick conductive silicone sheet. The 3-inch spaced resistance measurement of the strip was 0.18 ohms (about 0.0027 ohm-cm).

The resistance after aging (FIG. 2) this strip at 195° C. for 500 hours was 0.33 ohms (about 0.0049 ohm-cm). The resistance after aging at 195° C. for 1000 hours was 0.53 ohms (about 0.008 ohm-cm).

EXAMPLE 8

Another conductive silicone sheet was prepared by similar processing conditions and materials as those described in Example 6 with the difference it is that the silver coated copper powder from Example 5 was heat pretreated at 195° C. for 310 hours before being used to make up the conductive silicone sheet. A ½-inch by 4-inch strip was cut out of the resulting 0.034 inch thick conductive silicone sheet. The 3-inch spaced resistance of this strip was 0.4 ohms (about 0.0059 ohm-cm).

The resistance after aging (FIG. 2) this trip at 195° C. for 1400 hours was only 0.55 ohms (about 0.0082 ohm-cm). The combined improvements in the silver coated copper powder, due to the sodium cyanide pretreatment of the copper powder and the high temperature long-term heat pretreatment of the silver coated copper powder, provide a conductive silicone product with long term stability even at high temperatures.

EXAMPLE 9

Silver-coated copper powder was prepared by using similar plating conditions as those described in Example 5 with the difference being that 3 troy ounce of silver were replacement plated per each pound of copper powder instead of 2 tray ounces.

EXAMPLE 10

The same material and procedure as described in Example 2 was used to prepare a conductive silicone sheet except 60 parts by weight of Example 9 silver coated copper powder which had been pre-heat treated for 15 hours at 195° C. was used as the conductive filler. A ½-inch by 4-inch strip was cut out of the 0.034 inch thick conductive silicone sheet. The 3-inch spaced resistance measurement of this strip was 0.1 ohms (about 0.0015 ohm-cm).

The resistance after aging (FIG. 3) this strip at 195° C. for 109 hours was 0.35 ohms (about 0.0052 ohm-cm). The resistance of this strip after 1325 hours at 195° C. was 37 ohms (about 0.55 ohm-cm). The fifty percent increase in silver coating weight on the copper powder used in this conductive silicone increased heat aging stability of the conductive silicone as much as 3 times over the heat aging of the conductive silicone in Example 6.

EXAMPLE 11

Another conductive silicone sheet was prepared using similar processing conditions and materials as those described in Example 10 with the difference being that the silver coated copper powder from Example 9 was heat pretreated at 195° C. for 263 hours before it is used to make up the conductive silicone sheet. A ½-inch by 4-inch strip was cut out of the 0.035 inch thick conductive silicone sheet. The 3-inch spaced resistance measurement of this strip was 0.15 ohms (about 0.0022 ohm-cm).

The resistance after aging (FIG. 3) this strip at 195° C. for 1400 hours was 0.37 ohms (about 0.005 ohm-cm). This conductive silicone was 100 times more conductive when aged at 195° C. for 1400 hours over the conductive silicone in Example 3B with similar heat aging and the only difference between two conductive silicones was that this one had it silver copper powder pre-heat treated for a longer period of time at 195° C.

EXAMPLE 12

The copper powder was silver plated under similar conditions to those in Example 5 with differences being that the sodium cyanide concentration was 16 ozs. per gallon and, after the copper powder was pretreated with a sodium cyanide solution for 11 minutes, the copper powder was rinsed with water and than dispersed in fresh sodium cyanide solution before the silver cyanide-sodium cyanide solution was added. Two troy ounces of silver was replacement plated per pound of copper powder.

EXAMPLE 13

The same material and procedure as described in Example 2 was used to prepare a conductive silicone sheet except 60 parts by weight of Example 12 silver coated copper powder were used as the conductive filler. A ½-inch by 4-inch strip was cut out of the 0.034 inch thick conductive silicone sheet. The 3-inch space resistance of this strip was 0.2 ohms (about 0.003 ohm-cm).

The resistance after aging (FIG. 4) this strip at 195° C. for 69 hours was greater than 50,000 ohms.

EXAMPLE 14

A conductive silicone sheet was prepared by using similar processing conditions and materials as those in Example 13 with the difference being that the silver coated copper powder from Example 12 was heat pretreated at 195° C. for 110 hours before it was used to make up the conductive silicone sheet. A ½-inch by 4-inch strip was cut out of the 0.033 inch thick conductive silicone sheet. The resistance of the strip with probes 3 inches apart was 0.8 ohms (about 0.012 ohm-cm).

The above conductive silicone strip was aged (FIG. 4) at 195° C. for 87 hours and again tested with its resistance being 0.9 ohms (about 0.013 ohm-cm). After 500 hours at 195° C. the resistance was 32 ohms (about 0.47 ohm-cm).

EXAMPLE 15

Another conductive silicone sheet was prepared by using similar processing conditions and material as those described in Example 13 with the difference being that the silver coated powder from Example 12 was heat pretreated at 152° C. for 120 hours before it was used to make up the conductive silicone sheet. A ½-inch by 4-inch strip was cut out of the 0.034 inch thick conductive silicone sheet. The 3-inch space resistance of the strip was 0.18 ohms (0.0027 ohm-cm).

After aging (FIG. 4) the above strip at 195° C. for 95 hours the resistance increased to 6.7 ohms (0.099 ohm-cm). And after 418 hours at 195° C. the resistance was greater than 50,000 ohms.

EXAMPLE 16

Similar processing conditions and materials were used as those described in Example 13 with the exception being that the silver coated copper powder from Example 12 was heat pretreated at 152° C. for 288 hours before being used to make up the conductive silicone sheet. A ½-inch by 4-inch strip was cut out of the 0.034 inch thick conductive silicone sheet. The 3-inch space resistance of the strip was 0.2 ohms (about 0.003 ohm-cm).

After heat aging (FIG. 4) the strip for 69 hours at 195° C. the resistance was 0.28 ohms (about 0.004 ohm-cm). And after heat aging the strip for 566 hours at 195° C. the resistance was 11.5 ohms (about 0.17 ohm-cm).

EXAMPLE 17

Example 13 was repeated except that the silver-coated copper powder of Example 12 was heat pretreated 152° C., 640 hours before it was used to make up the conductive silicone sheet. A ½-inch by 4-inch by 0.034-inch conductive strip was treated. The 3-inch spaced resistance was 0.2 ohms (0.003 ohm-centimeter). After heat aging 116 hours at 195° C. (See FIG. 4), the 3-inch spaced resistance was 0.26 ohms (about 0.004 ohm-cm). After heat aging the strip for 574 hours at 195° C., the 3-inch spaced resistance was 1.9 ohm (0.028 ohm-cm).

EXAMPLE 18

Example 13 was repeated except that the silver-coated copper powder of Example 12 was heat pretreated at 152° C. for 1551 hours it was being used to make up the silicone sheet.

A strip was tested as in Ex. 17. The initial 3-inch spaced resistance was 0.25 ohms (about 0.0038 ohm-cm). When heat-aged for 64 hours at 195° C. (See FIG. 4), the 3-inch spaced resistance was 0.28 ohms (0.004 ohm-cm); after 231 hours at 195° C., the resistance was 0.35 ohm (0.005 ohm-cms).

EXAMPLE 19

A covered Pyrex dish as used to hold 4.25 lbs. of silver-coated copper powder of the type described in Example 5. The powder covered the bottom of the dish in a depth of about 1 inch.

This powder was heat-pretreated for 135 hours at 195° C.

A conductive epoxy resin was obtained by prepared by mixing 4 parts of an epoxy (45 parts EPO 828, Shell Chemical; and 5 parts diluent, 37-058 Reichold Chemical) with 14.64 parts of the heat-treated metal powder and 0.88 parts of methane diamine (Rohm and Haas). The resulting thick paste was then used as an adhesive to bond, (by curing 17 hours at 98° C.) a copper jumper to two separate, clean aluminum surfaces resulting in an initial resistance of less than 0.10 ohm between the two surfaces. After aging for 1000 hours at 195° C., the resistance between the two aluminum surfaces was still less than 0.1 ohm.

EXAMPLES 20–23

The same powder used in Example 19 is used to fill a series of organic polymer systems including the vinyl polymers, such as polyvinylidene-chloride copolymer and poly-vinyl chloride, plastisol prepolymerized polyurethanes of both the polyester and polyether types. Metal filling is typically carried out in the range of 70–80 weight per cent of total solids.

Resistance to decay of electroconductive properties under conditions of long term aging are excellent.

It is also to be understood that the following claims are intended to cover all of the generic and specific features of the invention herein described and all statements of the scope of the invention which might be said to fall therebetween.

What is claimed is:

1. A process of making an electrically conductive metal powder of average particle dimension of less than 0.025 inch comprising cleaning copper powder in a metal-complexing cleaning bath to form a clean powder, therupon plating the surface of the resultant clean powder with a silver coating in a plating solution, while maintaining continuous agitation of said plating solution, rinsing, drying, and then heat treating said powder at a temperature of at least about 130° C. for a period of time effective to enhance its heat-aging stability when loaded into an organic polymer resin matrix.

2. The process of claim 1 wherein said complexing agent is cyanide ion.

3. The process of claim 2 wherein said cyanide ion is obtained from sodium cyanide or potassium cyanide.

4. A process as defined in claim 1 wherein said heat-treating said electrically conductive powder, after said plating step, takes place at a temperature of from about 130° C. to 210° C. for a period of time greater than 24 hours.

5. A process as defined in claim 2 wherein said organic polymer resin is a silicone resin.

6. A process as defined in claim 4 wherein said heat treating is carried out at a temperature of at least about 130° C. for a period of at least about 70 hours.

7. The process of claim 2 wherein said copper powder is substantially pure copper.

8. The process of claim 1 wherein said replacement plating is carried out in a plating bath of silver nitrate or silver cyanide.

9. The process of claim 2 wherein said plating is carried out in a plating bath of silver nitrate or silver cyanide.

10. The process of claim 3 wherein said replacement plating is carried out in a plating bath of silver nitrate or silver cyanide.

11. A process as defined in claim 4 wherein said copper powder has an average particle size below 0.010 inch.

12. A process as defined in claim 1 wherein said heat-aging stability of said metal powder is manifested by the characteristic of maintaining a volume resistivity of less than 2 ohm-cm after being subjected to an age test at 195° C. for 500 hours in the Standard Test.

13. A process as defined in claim 12 wherein said volume resistivity is maintained for 1000 hours in a Standard Test.

14. A process as defined in claim 4 wherein said heat-aging stability of said metal powder is manifested by the characteristic of maintaining a volume resistivity of less than 2 ohm-cm after being subjected to an age test at 195° C. for 500 hours in the Standard Test.

15. A process as defined in claim 6 wherein said heat-aging stability of said metal powder is manifested by the characteristic of maintaining a volume resistivity of less than 2 ohm-cm after being subjected to an age test at 195° C. for 500 hours in the Standard Test.

16. A process as defined in claim 1 wherein said heat aging stability is manifested by an increase in volume resistivity of less than a factor of 100 in the first 100 hours at 195° C. in the Standard Test.

17. A process as defined in claim 4 wherein said heat aging stability is characterized by an inrease in volume resistivity of less than a factor of 100 in the first 100 hours at 195° in the Standard Test.

18. A process of making an improved electrically conductive metal powder of average particle dimension of less than about 0.025 inch comprising a coating of silver on a copper core by heat-treating said powder, for a period of time effective to enhance its heat-aging stability, as measured by Standard Test, such that the resistivity of said formation in said Test increases to less than 2 ohm-cm after being subjected to the Standard Test at at 195° C. for 500 hours.

19. A process as defined in claim 18 wherein said heat-treating is carried out at temperatures above 130° C.

20. A process as defined in claim 18 wherein said powder has an average particle diameter of less than 0.010 inch.

21. A process as defined in claim 18 wherein said silver coating is derived from silver ions of a salt selected from silver cyanide and silver nitrate.

22. An electrically conductive metal powder formed of a copper core with a continuous, thin, adherent silver coating thereover said powder being characterized by a heat-aging stability which is manifested by the characteristic of the Standard Test, whereby said powder in particle-to-particle contact, within test composition provides means to maintain a volume resistivity of less than 2 ohm-cm in said Test matrix after being subjected to an age test at 195° C. for 500 hours.

23. A powder as defined in claim 22 wherein said volume resistivity of said Standard Test of is maintained for 1000 hours at 195° C.

24. A powder as defined in claim 22 wherein said copper core is substantially pure copper and said copper powder has an average particle diameter of less than 0.025 inches.

25. A powder as defined in claim 23 wherein said copper powder has an average particle diameter of below 0.010 inches.

26. A powder as defined in claim 25 wherein said heat-aging stability of said metal powder is manifested by the characteristic of said powder maintaining a volume resistivity of less than 2 ohm-cm when loaded into the Standard Test in particle-to-particle contact and being subjected to an age test at 195° C. for 500 hours.

27. A powder as defined in claim 22 wherein said heat aging stability of said powder, when loaded in particle-to-particle contact in said Standard Test manifests an increase in volume resistivity of a factor of 100 times in 500 hours at 195° C.

28. A powder as defined in claim 27 wherein said heat aging stability of said powder, when loaded in particle-to-particle contact in said Standard Test manifests an increase in volume resistivity of less than 100% in 500 hours at 195° C.

29. A powder as defined in claim 22 comprising from about 0.5 to 4 troy ounces of silver per pound of copper.

30. A powder as defined in claim 25 comprising from about 0.5 to 4 troy ounces of silver per pound of copper.

31. A process of making an improved electrically conductive metal powder of average particle dimension of less than about 0.025 inch comprising of a coating of silver on a copper core by heat treating said powder at a temperature of 130° to 210° C. for more than 24 hours.

32. A process of making an improved electrically conductive metal powder of the type comprising a coating of silver on a copper core by heating said powder at a temperature of 130° to 210° C. for more than 70 hours.

33. A process as defined in claim 31 wherein the amount of copper is 0.5 to 4 troy ounces per pound of silver, and wherein the average particle size of the powder is less than 0.010 inch in diameter.

* * * * *

UNITED STATES PATENT AND TRADEMARK OFFICE
CERTIFICATE OF CORRECTION

PATENT NO. : 4,716,081

DATED : December 29, 1987

INVENTOR(S) : John E. Ehrreich

It is certified that error appears in the above-identified patent and that said Letters Patent is hereby corrected as shown below:

Column 6, Line 38 "(24 oz./gal.)" should read --(23 oz./gal.)--;

Column 9, Line 45 "methane" should read --menthane--.

Signed and Sealed this

Fourteenth Day of June, 1988

*Attest:*

DONALD J. QUIGG

*Attesting Officer* *Commissioner of Patents and Trademarks*